(12) United States Patent
Berry et al.

(10) Patent No.: US 10,372,866 B2
(45) Date of Patent: Aug. 6, 2019

(54) DATA PROCESSING SYSTEM TO IMPLEMENT WIRING/SILICON BLOCKAGES VIA PARAMETERIZED CELLS

(71) Applicant: International Business Machines Corporation, Armonk, NY (US)

(72) Inventors: Christopher J. Berry, Hudson, NY (US); Adam R. Jatkowski, Wyoming, PA (US); Frank Malgioglio, Hopewell Junction, NY (US); Ryan M. Nett, Austin, TX (US); Joseph J. Palumbo, Poughkeepsie, NY (US); Sean Salisbury, Poughkeepsie, NY (US); Gerald L. Strevig, III, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 174 days.

(21) Appl. No.: 15/431,061

(22) Filed: Feb. 13, 2017

(65) Prior Publication Data

US 2018/0232481 A1 Aug. 16, 2018

(51) Int. Cl.
G06F 17/50 (2006.01)

(52) U.S. Cl.
CPC ...... *G06F 17/5077* (2013.01); *G06F 17/5072* (2013.01); *G06F 2217/06* (2013.01)

(58) Field of Classification Search
CPC ............ G06F 17/5045; G06F 17/5068; G06F 17/5072; G06F 17/5077; G06F 17/5081
USPC .......................................... 716/110, 119, 126
See application file for complete search history.

(56) References Cited

U.S. PATENT DOCUMENTS

| | | |
|---|---|---|
| 6,401,234 B1 | 6/2002 | Alpert et al. |
| 6,574,786 B1 | 6/2003 | Pohlenz et al. |
| 6,996,512 B2 | 2/2006 | Alpert et al. |
| 8,230,378 B2 | 7/2012 | Cohn et al. |
| 8,689,170 B2 | 4/2014 | Ellavsky et al. |
| 2006/0095874 A1 | 5/2006 | Jiang et al. |
| 2009/0222783 A1 | 9/2009 | Culp et al. |

(Continued)

OTHER PUBLICATIONS

UMC, "90 Nanometer", http://www.umc.com/english/pdf/90nm_DM.pdf, Oct. 2, 2014 (obtained from creation data of the PDF document), 12 pages.

*Primary Examiner* — Paul Dinh
(74) *Attorney, Agent, or Firm* — Cantor Colburn LLP; Margaret McNamara

(57) ABSTRACT

A data processing system to implement wiring/silicon blockages via parameterized cells (pCells) includes a front end-of-line placement/blockage (FEOL P/B) controller to generate a placement blockage based on an input parameter corresponding to a physical design of an integrated circuit (IC). The FEOL P/B outputs a placement blockage parameter that is stored in a wire track allocation database to indicate the placement blockage. A back end-of-line wiring track (BEOL WT) controller generates a wire track blockage of the IC. A BEOL power track (BEOL PT) controller generates a metal blockage within the wire track blockage. A combination of the metal blockage and the wire track blockage defines a parent-child contract to enable concurrent physical design of the IC without creating shorts and overlaps in a child block of the IC.

20 Claims, 4 Drawing Sheets

(56) References Cited

U.S. PATENT DOCUMENTS

2013/0275937 A1\* 10/2013 Joshi .................. G06F 17/5018
716/119
2015/0143319 A1\* 5/2015 Lee .................... G06F 17/5068
716/118

\* cited by examiner

DATA PROCESSING SYSTEM TO IMPLEMENT WIRING/SILICON BLOCKAGES VIA PARAMETERIZED CELLS

BACKGROUND

The present invention relates to integrated circuit (IC) chip design and, more particularly, placement and insertion of wiring and silicon blockage on an IC chip.

Modern IC chip design typically involves the Very-large-scale integration (VLSI) process of arranging and inserting transistors, wiring paths and silicon blockages on a single chip. In a complex VLSI design environment where concurrent and hierarchical design is critical to meeting schedule, the ability to create and maintain robust wiring contracts becomes crucial. These wiring contracts are the cornerstone of enabling concurrent design and stitching multiple cell designs together (which share the same airspace) without creating shorts and overlaps.

One subset of this paradigm is the ability to insert front end-of-line (FEOL) cells at the top level of the design hierarchy (above child blocks) without overlapping cells or wire inside the child block. This especially becomes a necessity in the use of buffers (or signal repeaters) whose usage has escalated exponentially from technology to technology because of ever increasing circuit densities and the fact that wire performance has been unable to keep up with increasing circuit performance. In a case where the chip top level floorplan will utilize a million or so buffers, it becomes critical that the designer can place these buffers where they are needed, especially in a floorplan dominated by large sub-blocks (or units). It is also just as important to keep these buffers at the top level instead of trying to insert chip level signals into child blocks, which would then require changes in the netlist of those child blocks. Being able to control buffer insertion at one's own level of hierarchy prevents costly updates of Verilog/VHDL and provides more independence of the physical design from the logic design. Historically, inserting buffers over child blocks has been done by creating silicon and wire 'cut-outs' in the child block that can utilized by the parent level. In previous designs, these cut-outs were rigid and tedious to implement.

SUMMARY

According to a non-limiting embodiment, a data processing system to implement wiring/silicon blockages via parameterized cells (pCells) includes a front end-of-line placement/blockage (FEOL P/B) controller to generate a placement blockage based on an input parameter corresponding to a physical design of an integrated circuit (IC). The FEOL P/B outputs a placement blockage parameter that is stored in a wire track allocation database to indicate the placement blockage. A back end-of-line wiring track (BEOL WT) controller generates a wire track blockage of the IC. A BEOL power track (BEOL PT) controller generates a metal blockage within the wire track blockage. A combination of the metal blockage and the wire track blockage defines a parent-child contract to enable a concurrent physical design of the IC without creating shorts and overlaps in a child block of the IC.

According to another non-limiting embodiment, a method of implementing wiring/silicon blockages via parameterized cells (pCells) comprises generating, via a front end-of-line placement/blockage (FEOL P/B) controller, at least one placement blockage based on an input parameter corresponding to a physical design of an integrated circuit (IC). The method further includes outputting a placement blockage parameter indicating the at least one placement blockage and storing the at least one placement blockage in a wire track allocation database. The method further includes generating, via a back end-of-line wiring track (BEOL WT) controller, a wire track blockage of the IC, and generating, via a BEOL power track (BEOL PT) controller, a metal blockage within the wire track blockage. The method further includes defining a parent-child contract to enable concurrent physical design of the IC without creating shorts and overlaps in a child block of the IC based on a combination of the metal blockage and wire track blockage.

According to yet another non-limiting embodiment, a computer program product is configured to implement wiring/silicon blockages via parameterized cells (pCells). The computer program product comprises a computer readable storage medium having program instructions embodied therewith. The program instructions are executable by an electronic pCell processor to cause the pCell processor to generate, via a front end-of-line placement/blockage (FEOL P/B) controller, at least one placement blockage based on an input parameter corresponding to a physical design of an integrated circuit (IC). The program instructions further cause the pCell processor to output a placement blockage parameter indicating the at least one placement blockage and store the at least one placement blockage in a wire track allocation database. The program instructions further cause the pCell processor to generate, via a back end-of-line wiring track (BEOL WT) controller, a wire track blockage of the IC, and to generate, via a BEOL power track (BEOL PT) controller, a power pin within the wire track blockage. The program instructions further cause the pCell processor to define a parent-child contract to enable concurrent physical design of the IC without creating shorts and overlaps in a child block of the IC based on a combination of the metal blockage and wire track blockage.

Additional features are realized through the techniques of the present invention. Other embodiments are described in detail herein and are considered a part of the claimed invention. For a better understanding of the invention with the features, refer to the description and to the drawings.

DETAILED DESCRIPTION

Wiring contracts enable chip designers to achieve concurrent design while stitching multiple cell designs together (which share the same airspace) without creating shorts and overlaps. Physical IC design typically requires management of child block placement with respect to its parent block. Child blocks are typically referred to as a collection of circuits that are physically contained within bounds of a larger entity referred to as a parent block. A floating point unit and a multiplier is just one example of a parent-child relationship.

One subset of this paradigm is the ability to insert front end-of-line (FEOL) cells at the top level of the design hierarchy (above child blocks) without overlapping cells or wire inside the child block. This especially becomes a necessity in the use of buffers (or signal repeaters) whose usage has escalated exponentially from technology to technology because of ever increasing circuit densities and the fact that wire performance has been unable to keep up with increasing circuit performance.

Buffer insertion has become a critical step in deep submicron design as interconnect now plays a dominating role in determining system performance. The insertion of buffers and inverters on signal nets can provide several advantages, including reducing interconnect delay, restraining noise, improving the slew rate, and fixing electrical violations. Current designs easily require buffering of several thousands. To manage the large number of buffers and also achieve high performance on the critical global nets, buffers must be planned for early in the design, so that the rest of the design flow is aware of the required buffering resources. In addition, design routability has also become a critical problem; one must make sure that an achievable routing solution exists during the physical floor-planning stage. Thus, global wiring must be planned early to minimize routing congestion, hot spots, and crosstalk problems later on in the flow.

In a case where the chip top level floorplan will utilize a million or so buffers, it becomes critical that the designer can place these buffers where they are needed, especially in a floorplan dominated by large sub-blocks (or units). It is also just as important to keep these buffers at the top level instead of trying to insert chip level signals into child blocks, which would then require changes in the netlist of those child blocks. Being able to control buffer insertion at one's own level of hierarchy prevents costly updates of Verilog/VHDL and provides more independence of the physical design from the logic design. Historically, inserting buffers over child blocks has been done by creating silicon and wire 'cut-outs' in the child block that can utilized by the parent level. In previous designs, these cut-outs were rigid and tedious to implement.

Figure 1:
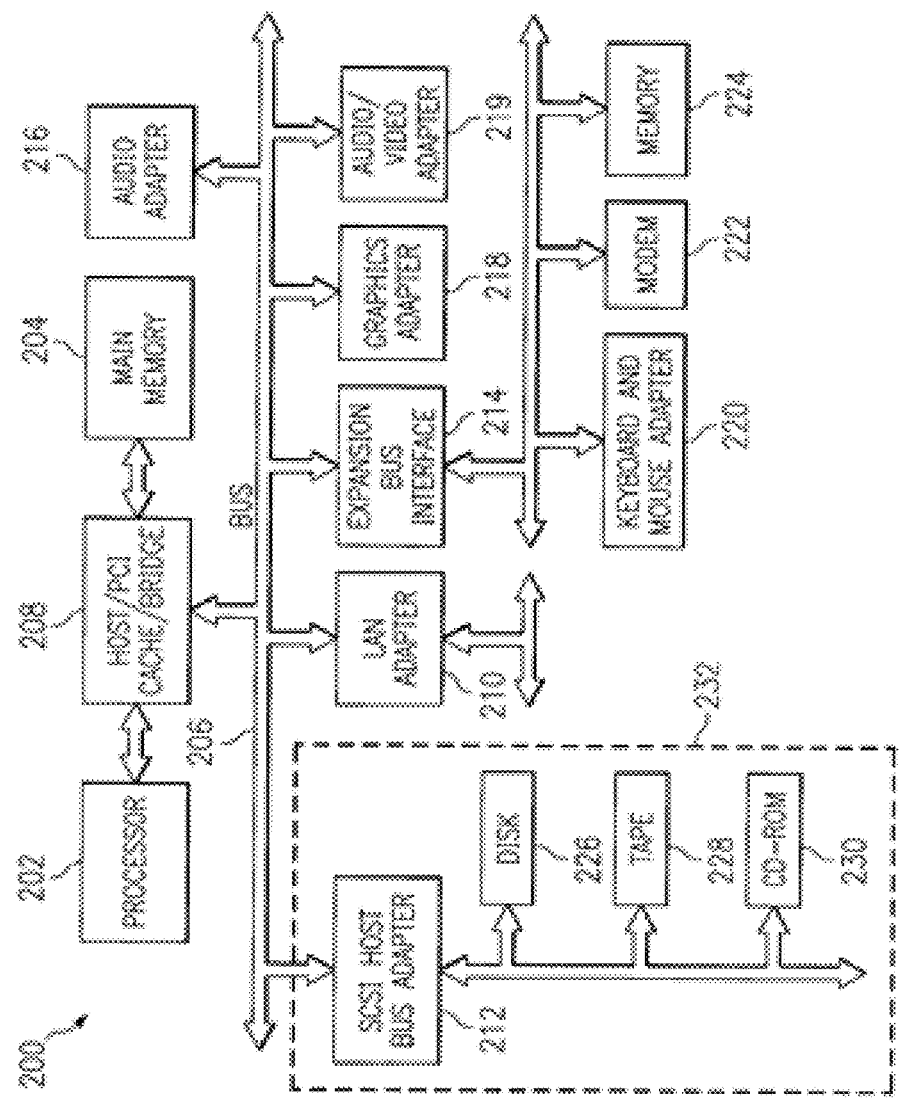
FIG. 1 is a block diagram illustrating a data processing system configured to implement wiring/silicon blockages via parameterized cells (pCells) according to a non-limiting embodiment.

With reference now to FIG. 1, a data processing system 200 configured to implement wiring/silicon blockages via parameterized cells (pCells) is illustrated according to a non-limiting embodiment. The data processing system 200 is an example of a data processing system that may be used to implement a computer program product for designing buffer block placement in an integrated circuit chip in accordance with the present invention. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. The processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards.

In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. Small computer system interface (SCSI) host bus adapter 212 provides a connection for hard disk drive 226, tape drive 228, and CD-ROM drive 230. Typical PCI local bus implementations will support three or four PCI expansion slots or add-in connectors.

An operating system runs on the processor 202 and is used to coordinate and provide control of various components within data processing system 200 in FIG. 1. The operating system may be a commercially available operating system, such as Windows 2000, which is available from Microsoft Corporation. An object oriented programming system such as Java may run in conjunction with the operating system and provide calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 1 may vary depending on the implementation. Other internal hardware or peripheral devices, such as flash ROM (or equivalent nonvolatile memory) or optical disk drives and the like, may be used in addition to or in place of the hardware depicted in FIG. 1. Also, the processes of the present invention may be applied to a multiprocessor data processing system.

As another example, the data processing system 200 may be a stand-alone system configured to be bootable without relying on some type of network communication interface, whether or not data processing system 200 comprises some type of network communication interface.

The depicted example in FIG. 1 and above-described examples are not meant to imply architectural limitations. For example, data processing system 200 also may be a notebook computer.

The present invention presents an alternative methodology to buffer block placement. It should be noted that as used herein, the term buffer refers to buffers for signal nets and not to clocked buffers. Compared to generic buffers, clocked buffers occupy more area, draw more current, and create hot spots, all of which requires different constraints and objectives than do net buffers.

Macro function block designers must allow global buffer and wiring resources to be interspersed within their designs wherever possible. This resource allocation need not be uniform; a function block with a lower performance requirement and complexity may be able to afford to allocate a higher percentage of its resources. A cache or function blocks within a datapath may not be able to allocate any resources.

To set aside a buffer resource within a block, the designer can insert what is referred to herein as a buffer site, i.e., physical area which can denote either a buffer, inverter (with a range of power levels), or even a decoupling capacitor. When a buffer site gets assigned to a net, a logical gate from the technology is actually specified. A net is a set of cells or pins to be connected together. These pins can be classified as either drivers or sinks. Each net has one driver and one or more sinks. A single-sink net has exactly one sink while a multi-sink net has two or more sinks. A net exists whether or not the blocks are placed before wiring. A "routed net" or "Steiner route" or "routing" refers to the wiring between placed cells/pins of the net. Until this assignment takes place, buffer sites are not connected to any nets.

Allocating a percentage of a macro block for buffer sites may be viewed as wasteful; however, if the sites are not used for buffering there are other ways to utilize them. For example, they can be populated with spare circuits to facilitate metal-only engineering changes late in the design cycle. Or, the sites can be populated with decoupling capacitors to enhance local power supply and signal stability. Thus, one can actually afford to allocate many more buffer sites than will ever be used.

Buffer sites can also be a powerful tool for semi-custom designs. For example, in a data flow there are typically regular signal buses routed across collections of data flow elements. These routes are generally expected to be implemented with straight wires if possible. If buffering for some or all of the strands of a data bus are required, it is important to have buffer locations available within the data path itself. If buffer sites are designed into the original data path layout, it is possible to add buffers late in the design cycle while maintaining straight wiring of the buses.

Buffer sites can also be used for a flat design style, e.g., a sea of buffer sites can be sprinkled throughout the placement. For hierarchical designs, one can view the buffer sites as flat to derive a similar sprinkling, but their distribution will likely be less uniform. Some regions could have, say, 5-10% of the area devoted to buffer sites, while a region containing the cache will have none. No matter which design style is used, a resource allocation algorithm can view buffer sites as flat, which enables it to make assignments to global routes based on buffer site distribution.

In at least one embodiment, the processor 202 is a pCell hardware processor 202 including one or more engines or electronic controllers to implement wiring/silicon blockages of physical IC design via pCells. The pCell processor 202 is configured to insert FEOL cells at the top level of a design hierarchy without overlapping cells or wires inside the child blocks. The insertion of these cut-outs employs Cadence Design Systems' Parameterized Cell technology, for example, which implements pCells to form malleable areas for parent level buffer bays. The pCell processor 202 codes up the buffer bays with all the necessary wire and silicon blockage areas. The buffer bays are generated with the correct width and spacing rules for a given chip design.

The pCell processor 202 is configured to perform snapping and stretching operations which correctly constructs all the internal blockages of the chip. For instance, the pCell processor 202 can execute one or more bay construction operations including, but not limited to, (i) a bay snapping operation, (ii) a bay sizing operation, (iii) a track shifting operation, and (iv) an edge condition awareness operation. The bay snapping operation ensures that reservation areas (e.g., buffer bays), blockages and/or power regions begin on the correct grid of the chip. The bay snapping operation is implemented by applying industry standard site pattern and site definition (siteDef) properties. The coarseness of the grid is determined by the ceiling parameter input to the pCell processor 202.

The bay sizing operation guarantees that a given reservation area (e.g., buffer bay) meets the required minimum grid constraints. For example, the bay sizing operation ensures that a given buffer bay starts and stops on multiples of the power grid to provide robust power connections. In at least one embodiment, the bay sizing operation is performed based on a width parameter, height parameter, and/or ceiling parameter input to the pCell processor 20. The width and height parameters can be rounded to the nearest multiple.

The track shifting operation performs slights shifts, reductions and/or expansions of a given reservation area (e.g., buffer bay). This track shifting operation can be utilized to satisfy DRC ground rule interactions that may be required in some instances of the design process.

The edge condition awareness operation manages power extensions and blockage reductions at placement boundaries. Accordingly, the condition awareness operation can allow for a child to be cleanly placed and routed at the adjacent boundary points without overlapping cells or wire inside the child block.

Figure 2:
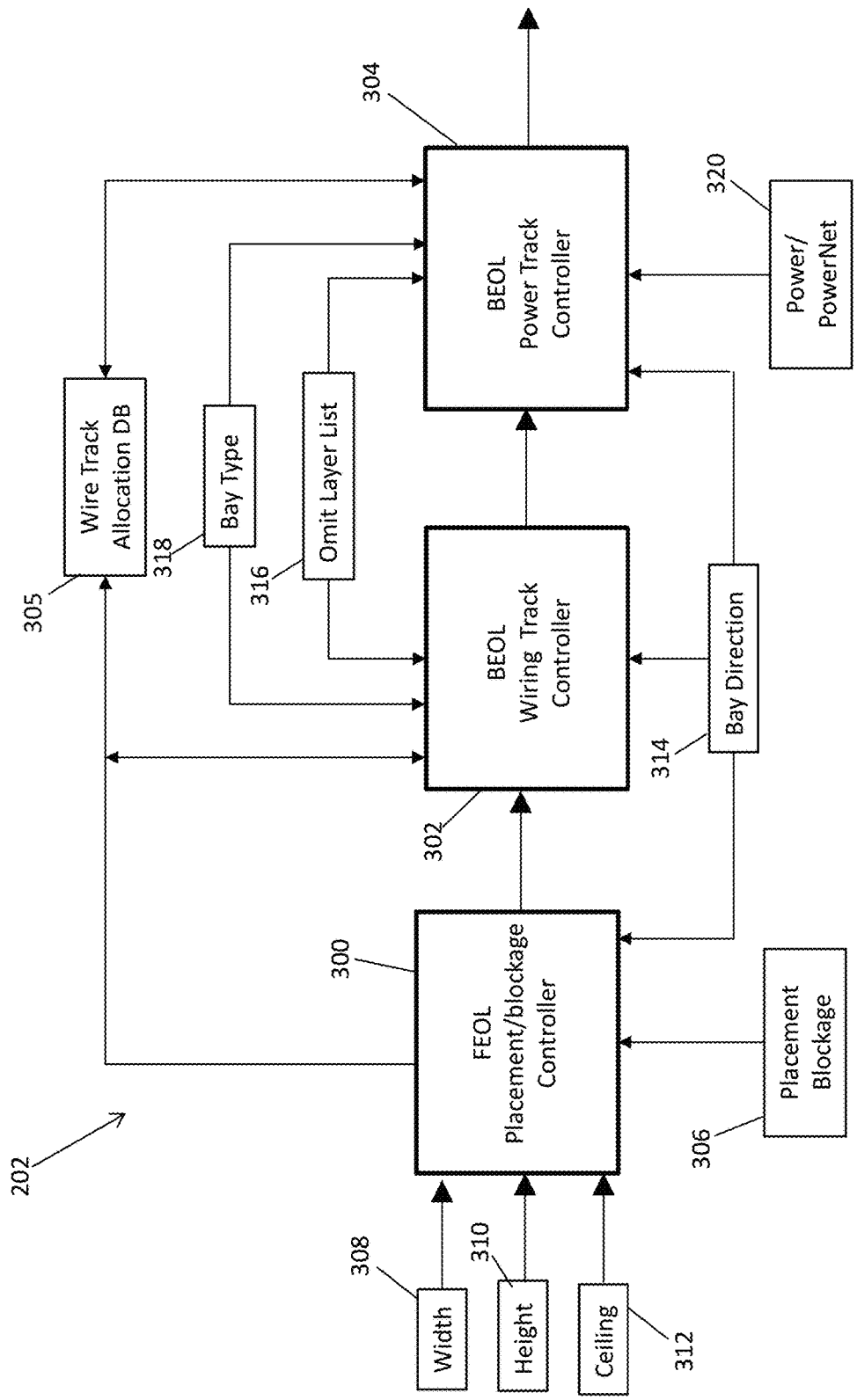
FIG. 2 is block diagram of a hardware pCell processor included in a data processing system configured to implement wiring/silicon blockages via pCells according to a non-limiting embodiment.

Turning now to FIG. 2, a block diagram of an electronic hardware pCell processor 202 included in a data processing system 200 configured to implement wiring/silicon blockages via pCells according to a non-limiting embodiment. The pCell processor 202 includes a front end-of-line placement/blockage (FEOL P/B) controller 300, a back end-of-line wiring track (BEOL WT) controller 302, and a BEOL power track (BEOL PT) controller 304.

Figure 4:
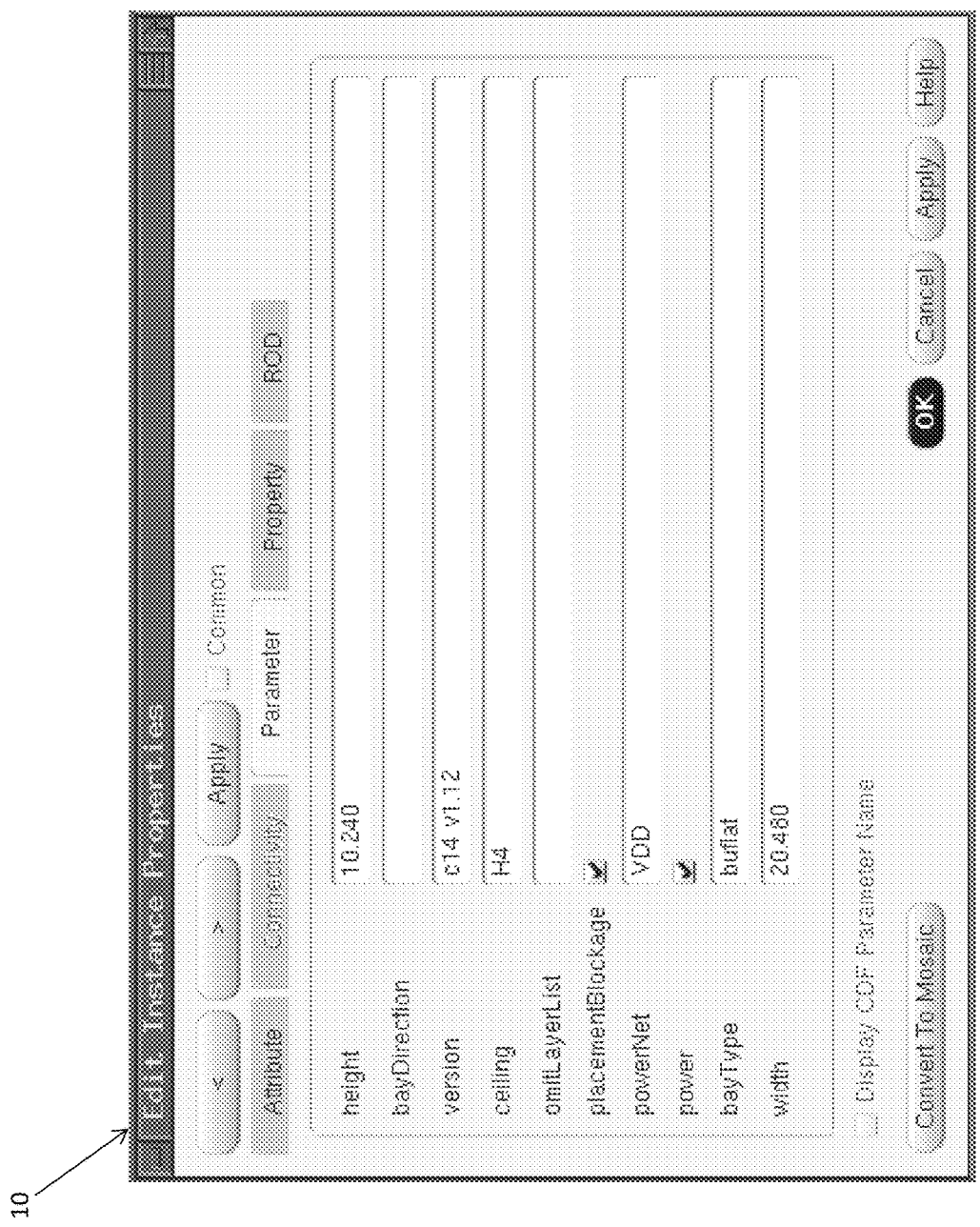
FIG. 4 illustrates a pCell computing interface configured to input various design parameters to the hardware pCell processor according to a non-limiting embodiment.

The FEOL P/B controller 300 is configured to define wiring/silicon blockage areas (i.e., keep out or blockage reservation areas) based on one or more input parameters. The input parameters include, but are not limited to, a placement blockage parameter 306, a width parameter 308, a height parameter 310, a ceiling parameter 312, and a bay direction parameter 314. These input parameters may be input to the FEOL P/B controller 300 by a chip designer via a pCell computing interface 10 (see FIG. 4). The generated wiring/silicon blockage parameters are then output from the FEOL P/B controller 300 and stored in a wire track allocation database (DB) 305, which can be subsequently queried by the FEOL P/B controller 300, the BEOL WT controller 302 and/or the BEOL PT controller 304.

The placement blockage parameter 306 is input to the FEOL P/B controller 300 to either activate or deactivate the FEOL P/B controller 300. For instance, selecting the placement blockage parameter 306 activates the FEOL P/B controller 300 to create the wiring/silicon blockage areas (i.e., keep out or blockage reservation areas). The width parameter 308 defines the width of a given wiring/silicon blockage area. The height parameter 310 defines the height of the given wiring/silicon blockage area. For instance, a given parent may not own every single metal layer in the chip, but is instead allocated only a predetermined number of layers. When contracting a child of a given parent, the ceiling parameter 312 specifies how far up the metal stack is to be contracted such that the appropriate number of metal layers allocated to the given parent is taken into account. The bay direction parameter 314, if selected or applied, commands the FEOL P/B controller 300 to over-ride an automatic aspect-ratio determination.

For instance, when the bay direction parameter 314 is deactivated, the FEOL P/B controller 300 automatically determines orientation of the bay (i.e., whether the bay is horizontally orientated or vertically orientated) the aspect-ratio of the placement blockage. For example, if the placement blockage is taller than it is wide, then the metal blockages are placed to allow porosity with respect to horizontal layers. However, designs may call for the opposite, i.e., in view of the wiring congestion of a known child. Therefore, the bay direction parameter 314 may be input (i.e., activated) so as to over-ride the automatic bay orientation feature.

The BEOL WT controller 302 is in signal communication with the FEOL P/B controller 300 to receive the parameters of the generated wiring/silicon blockage areas (i.e., keep out or blockage reservation areas). Based on the parameters of the generated wiring/silicon blockage areas, the BEOL WT controller 302 defines the wire track blockages for each horizontal layer and the wire track blockages for each vertical layer. In at least one embodiment, the BEOL WT controller 302 defines the horizontal and vertical wire track blockages based on the bay direction parameter 314, an omit layer list parameter 316, and a bay type parameter 318. The omit layer list parameter 316 is an optional list of metal layers that could be removed from the default pattern of layer blockages to be constructed in the resulting buffer bay Pcell. The bay type parameter 318 refers to the type of circuits allowed in the bay. A buffer type would only allow buffers and inverters while other circuits can include clocked circuits in addition to buffers and inverters. This parameter, in conjunction with the wire track allocation database 305 defines the default layer blockage patterns to be created.

In at least one embodiment, the BEOL WT controller 302 can further determine whether a horizontal layer and/or a vertical layer is a multi-patterned layer. When a horizontal or vertical layer is determined to be a multi-patterned layer, the BEOL WT controller 302 can automatically assign different color tracks to each layer in a given multi-patterned layer.

The BEOL PT controller 304 is in signal communication with the BEOL WT controller 302 to receive the parameters indicating the wire track blockages for the horizontal layers and the vertical layers. Based on the wire track blockages for the horizontal layers and the vertical layers, BEOL PT controller 304 defines the power tracks for each metal layer. In at least one embodiment, the power tracks a created based on the layer list parameter 316, the bay type parameter 318, and a power/power net parameter(s) 320. For instance, a power parameter can be selected to activate the BEOL PT controller 304. When activated, the BEOL PT controller 304 utilizes the power net parameter which ensures a child realizes correct power, connect regions, and/or avoid regions, accordingly. In addition, the BEOL PT controller 304 defines the specific power supply that needs to be connected to power the buffer site. In at least one embodiment, the creation of the power tracks includes defining power pins with specified dimensions, pitch, and connectivity.

The BEOL PT controller 304 can further determine whether a given metal layer is a multi-patterned layer. When a metal layer is determined to be a multi-patterned layer, the BEOL PT controller 304 can automatically assign different color tracks to each layer in a given multi-patterned metal layer.

Figure 3:
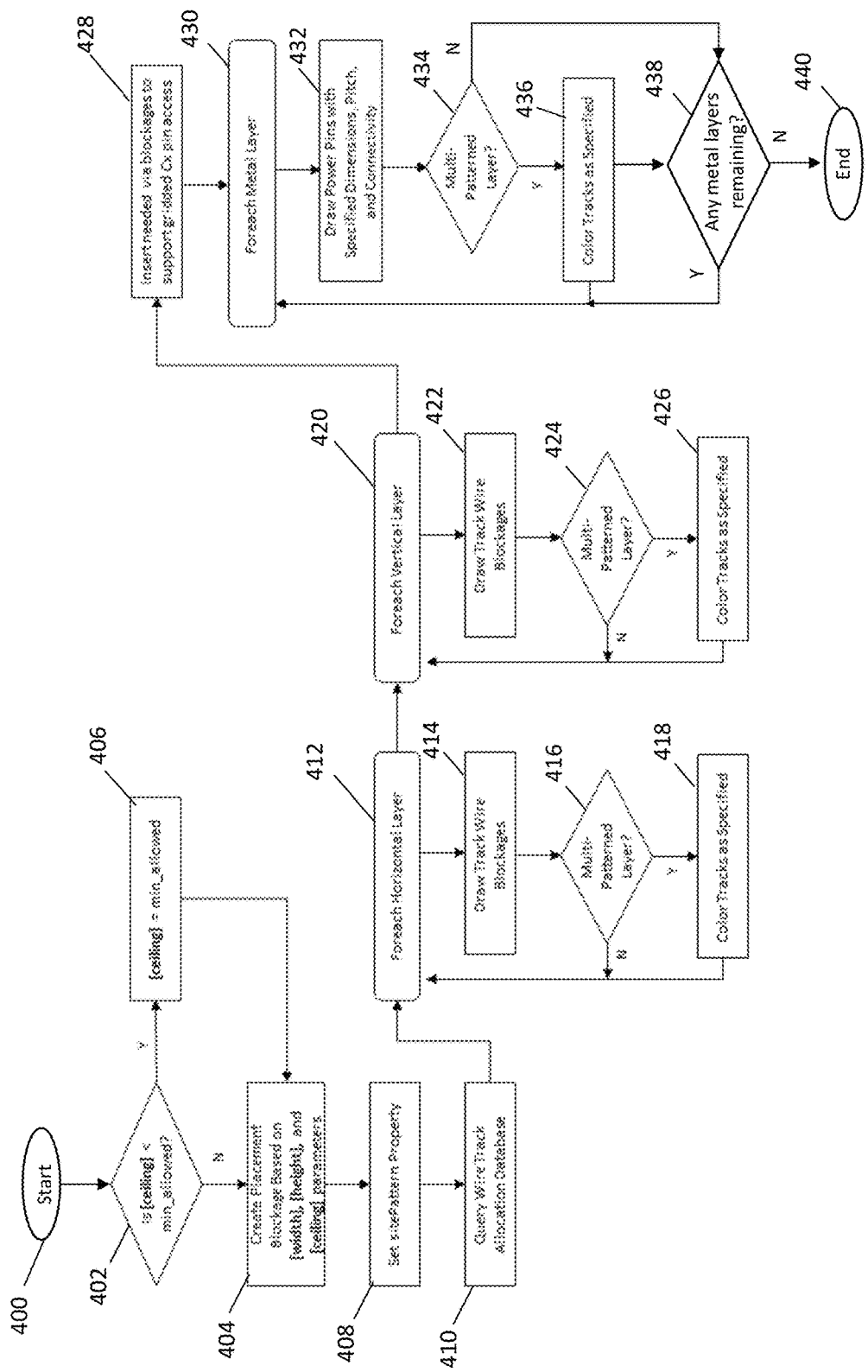
FIG. 3 is a flow diagram illustrating a method of implementing wiring/silicon blockages via pCells according to a non-limiting embodiment.

Referring to FIG. 3, a flow diagram illustrates a method of implementing wiring/silicon blockages via pCells according to a non-limiting embodiment. The method begins at operation 400, and operation 402, a determination is made as to whether an input ceiling parameter is less than a minimum ceiling value allocated to given physical IC design. When the input ceiling parameter is less than the minimum ceiling, the input ceiling parameter is automatically set to equal the minimum ceiling value allowed for the given chip at operation 404, and the method proceeds to operation 406 where placement blockages are created. When, however, the minimum ceiling value is not less than the minimum ceiling (i.e., the input ceiling parameter is greater than or equal to the minimum ceiling), the method proceeds directly to operation 406 and begins creating placement blockages. The placement blockages are based on various input parameters including, but not limited to, the input ceiling parameter, an input width parameter, and an input height parameter. Based on the placement blockage, a site pattern property is set at operation 408. At operation 410, a wire track allocation database is queried based on site pattern property and the generated placement blockage. The wire track allocation database defines each layer, and defines which tracks on each layer are being blocked or represented as power on a periodic basis. The BEOL WT 302 and PT 304 controllers utilize the wire track allocation database 305 to do a step and repeat pattern of blockages based on the defined width 308 and height 310 of the buffer site.

Turning to operation 412, an analysis of the database is performed to determine a total number of horizontal layers allocated to the chip, and wire track blockages are generated for each horizontal layer at operation 414. For each wire track blockage, an analysis is performed at operation 416 to determine if a given horizontal layer is a multi-patterned horizontal layer. When the horizontal layer is not a multi-patterned horizontal layer, the method returns to operation 412 to generate a wire track blockage for a next horizontal layer, should one exist. When, however, the horizontal layer is a multi-patterned horizontal layer, the tracks of the multi-patterned horizontal layer are colored at operation 418 to distinguish them from remaining horizontal tracks, and the method returns to operation 412 to generate a wire track blockage for a next horizontal layer. By explicitly coloring a given track, especially at lower layers, the child can be guaranteed authorization to place another component (e.g., wire) at minimum geometry next to the colored layer without incurring an overlap. The coloring, therefore, improves placement efficiency and maximizes area usage without overlap.

A similar wire track blockage creation process is performed at operation 420 with respect to the vertical layers of the chip. At operation 420, for instance, an analysis is performed to determine a total number of vertical layers allocated to the chip, and wire track blockages are generated for each vertical layer at operation 422. For each wire track blockage, an analysis is performed at operation 424 to determine if a given vertical layer is a multi-patterned vertical layer. When the vertical layer is not a multi-patterned vertical layer, the method returns to operation 420 to generate a wire track blockage for a next vertical layer, should one exist. When, however, the vertical layer is a multi-patterned vertical layer, the tracks of the multi-patterned vertical layer are colored at operation 426 to distinguish them from remaining vertical tracks, and the method returns to operation 420 to generate a wire track blockage for a next vertical layer. Although the process of generating wire track blockage for the vertical layers is described after generating the horizontal wire track blockages, it should be appreciated that the horizontal wire track blockages can be generated simultaneously along with the vertical wire track blockages.

Turning to operation 428, via blockages are inserted to support gridded Cx pin access. In cases where metal blockage defined in the wire track allocation database 410 is insufficient to allow parent via access, via blockage can be inserted over the potential buffer sites. At operation 430, an analysis is performed to determine a total number of metal layers allocated to the chip, and one or more power terminals are generated for each metal layer at operation 432. The power terminals are generated according to specified dimensions, pitch and connectivity for a given chip design. For each wire track blockage, an analysis is performed at operation 434 to determine if a given metal layer is a multi-patterned metal layer. When the metal layer is not a multi-patterned metal layer, the method proceeds to operation 438 to determine if any remaining metal layers exist. When no wire layers are left remaining, the method ends at operation 440.

When, however, the metal layer is identified as a multi-patterned metal layer at operation 434, the tracks of the multi-patterned metal layer are colored at operation 436 to distinguish them from remaining metal tracks. At operation 438, an analysis is performed to determine whether any remaining metal layers exist. If a metal layer still exists, the method returns to operation 430 to generate one or more power terminals for a next metal layer. Otherwise, the method ends at operation 440. The combination of the finalized horizontal/vertical wire blockages and the metal blockages within the horizontal/vertical wire blockages informs the child where components may not be place and/or where wiring may not be routed. Once the final metal layer is generated, the physical IC design can be finalized and a physical mask can be generated based on the physical IC design.

As described herein, various non-limiting embodiments provide a data processing system configured to implement wiring/silicon blockages via parameterized cells (pCells). The data processing system provides a contracting process that allows a parent level block to concurrently place sub-circuits inside a child level of hierarchy. In this manner, the child is not required to realize the exact placement of the parent level block, but instead provides the flexibility to continuously relocate the sub-circuits during design construction without overlapping cells or wire inside the child block.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A data processing system configured to implement wiring/silicon blockages via parameterized cells (pCells), the data processing system comprising:
   a front end-of-line placement/blockage (FEOL P/B) controller configured to generate at least one placement blockage based on an input parameter corresponding to a physical design of an integrated circuit (IC), and outputs a placement blockage parameter that is stored in a wire track allocation database to indicate the at least one placement blockage;
   a back end-of-line wiring track (BEOL WT) controller in signal communication with the FEOL P/B controller, the BEOL WT controller configured to generate a wire track blockage of the IC; and
   a BEOL power track (BEOL PT) controller in signal communication with the BEOL WT controller, the BEOL PT controller configured to generate a metal blockage within the wire track blockage;
   wherein a combination of the metal blockage and the wire track blockage defines a parent-child contract to enable concurrent physical design of the IC without creating shorts and overlaps in a child block of the IC, and
   wherein the concurrent physical design of the IC without creating shorts and overlaps in a child block of the IC is provided for manufacturing the IC, and
   wherein the parent-child contract indicates placement of the child block with respect to a larger parent block, the child block including at least one circuit that is physically contained within bounds of the parent block.

2. The data processing system of claim 1, wherein the input parameter includes at least one of a height parameter, a width parameter, and a ceiling parameter.

3. The data processing system of claim 1, wherein the BEOL WT controller generates a horizontal wire track blockage and a vertical wire track blockage extending perpendicular to the horizontal wire track blockage.

4. The data processing system of claim 3, wherein the BEOL WT controller determines a number of horizontal layers and a number of vertical layers based on the placement blockage parameter stored in the wire track allocation database.

5. The data processing system of claim 4, wherein the BEOL WT controller determines whether at least one of the horizontal wire track blockage and the vertical wire track blockage is a multi-patterned layer.

6. The data processing system of claim 5, wherein the BEOL WT controller generates a wire track blockage for each sub-layer included in the multi-patterned layer.

7. The data processing system of claim 1, wherein generating the metal blockage includes generating power terminals having specified dimensions, pitch and connectivity.

8. A method of implementing wiring/silicon blockages via parameterized cells (pCells), the method comprising:
   generating, via a front end-of-line placement/blockage (FEOL P/B) controller, at least one placement blockage based on an input parameter corresponding to a physical design of an integrated circuit (IC);
   outputting a placement blockage parameter indicating the at least one placement blockage and storing the at least one placement blockage in a wire track allocation database;
   generating, via a back end-of-line wiring track (BEOL WT) controller, a wire track blockage of the IC;
   generating, via a BEOL power track (BEOL PT) controller, a metal blockage within the wire track blockage; and
   defining a parent-child contract to enable concurrent physical design of the IC without creating shorts and overlaps in a child block of the IC based on a combination of the metal blockage and wire track blockage,
   wherein the concurrent physical design of the IC without creating shorts and overlaps in a child block of the IC is provided for manufacturing the IC, and
   wherein the parent-child contract indicates placement of the child block with respect to a larger parent block, the child block including at least one circuit that is physically contained within bounds of the parent block.

9. The method of claim 8, wherein the input parameter includes at least one of a height parameter, a width parameter, and a ceiling parameter.

10. The method of claim 8, further comprising generating, via the BEOL WT controller, a horizontal wire track blockage and a vertical wire track blockage extending perpendicular to the horizontal wire track blockage.

11. The method of claim 10, further comprising determining, via the BEOL WT controller, a number of horizontal layers and a number of vertical layers based on the placement blockage parameter stored in the wire track allocation database.

12. The method of claim 11, further comprising determining, via the BEOL WT controller, whether at least one of the horizontal wire track blockage and the vertical wire track blockage is a multi-patterned layer.

13. The method of claim 12, further comprising generating, via the BEOL WT controller, a wire track blockage for each sub-layer included in the multi-patterned layer.

14. The method of claim 8, further comprising generating, via the BEOL PT controller, power terminals having specified dimensions, pitch and connectivity based on the metal blockage.

15. A computer program product configured to implement wiring/silicon blockages via parameterized cells (pCells), the computer program product comprising a computer readable storage medium having program instructions embodied therewith, the program instructions executable by an electronic pCell processor to cause the pCell processor to:
- generate, via a front end-of-line placement/blockage (FEOL P/B) controller, at least one placement blockage based on an input parameter corresponding to a physical design of an integrated circuit (IC);
- output a placement blockage parameter indicating the at least one placement blockage and store the at least one placement blockage in a wire track allocation database;
- generate, via a back end-of-line wiring track (BEOL WT) controller, a wire track blockage of the IC;
- generate, via a BEOL power track (BEOL PT) controller, a power pin within the wire track blockage; and
- define a parent-child contract to enable concurrent physical design of the IC without creating shorts and overlaps in a child block of the IC based on a combination of the metal blockage and wire track blockage,
- wherein the concurrent physical design of the IC without creating shorts and overlaps in a child block of the IC is provided for manufacturing the IC, and
- wherein the parent-child contract indicates placement of the child block with respect to a larger parent block, the child block including at least one circuit that is physically contained within bounds of the parent block.

16. The computer program product of claim 15, wherein the input parameter includes at least one of a height parameter, a width parameter, and a ceiling parameter.

17. The computer program product of claim 15, wherein the pCell processor to commands the BEOL WT controller to generate a horizontal wire track blockage and a vertical wire track blockage extending perpendicular to the horizontal wire track blockage.

18. The computer program product of claim 17, wherein the pCell processor to commands the BEOL WT controller to determine a number of horizontal layers and a number of vertical layers based on the placement blockage parameter stored in the wire track allocation database.

19. The computer program product of claim 18, wherein the pCell processor to commands the BEOL WT controller to determine whether at least one of the horizontal wire track blockage and the vertical wire track blockage is a multi-patterned layer.

20. The computer program product of claim 19, wherein the pCell processor to commands the BEOL WT controller to generate a wire track blockage for each sub-layer included in the multi-patterned layer, and wherein the pCell processor to commands the BEOL PT controller to generate power terminals having specified dimensions, pitch and connectivity based on the metal blockage.

* * * * *